United States Patent
Kidron et al.

(10) Patent No.: US 9,294,983 B2
(45) Date of Patent: Mar. 22, 2016

(54) METHODS AND ARRANGEMENTS FOR A MULTISTACK BLUETOOTH CONTROLLER

(71) Applicant: Intel Corporation, Santa Clara, CA (US)

(72) Inventors: Amihai Kidron, Portland, OR (US); Albert O. Ho, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 13/631,879

(22) Filed: Sep. 29, 2012

(65) Prior Publication Data

US 2014/0092806 A1    Apr. 3, 2014

(51) Int. Cl.
| | |
|---|---|
| G06F 13/10 | (2006.01) |
| G06F 13/12 | (2006.01) |
| G06F 13/14 | (2006.01) |
| G06F 13/16 | (2006.01) |
| H04W 40/02 | (2009.01) |

(52) U.S. Cl.
CPC ............... *H04W 40/02* (2013.01); *G06F 13/10* (2013.01); *G06F 13/12* (2013.01); *G06F 13/14* (2013.01); *G06F 13/16* (2013.01)

(58) Field of Classification Search
USPC .............. 370/339, 389, 392–393, 398–399, 370/395.7, 422–426; 709/230–237
See application file for complete search history.

(56) References Cited

U.S. PATENT DOCUMENTS

| | | | |
|---|---|---|---|
| 2004/0048572 A1 | 3/2004 | Godfrey | |
| 2004/0214576 A1* | 10/2004 | Myers et al. | 455/445 |
| 2008/0212649 A1* | 9/2008 | Jougit | 375/130 |
| 2011/0307945 A1* | 12/2011 | Huang | 726/6 |
| 2012/0044913 A1 | 2/2012 | Smadi | |
| 2012/0066695 A1 | 3/2012 | Berezansky et al. | |
| 2012/0083209 A1 | 4/2012 | Giles et al. | |

FOREIGN PATENT DOCUMENTS

WO    2014/051821 A1    4/2014

OTHER PUBLICATIONS

International Preliminary Report on Patentability and Written Opinion received for PCT Patent Application No. PCT/US2013/048811, mailed on Apr. 9, 2015, 13 Pages.
International Search Report and Written Opinion received for PCT Patent Application No. PCT/US2013/048811, mailed on Sep. 30, 2013, 16 Pages.

* cited by examiner

*Primary Examiner* — Michael Thier
*Assistant Examiner* — Eric Myers
(74) *Attorney, Agent, or Firm* — Schubert Law Group PLLC

(57) ABSTRACT

Embodiments may comprise logic such as hardware and/or code to assign or offload Bluetooth applications from the main processor while maintaining the legacy interface to the OS protocol stack and compatibility to legacy Bluetooth applications. Embodiments may comprise selection logic such as a multiplexer in the Bluetooth radio controller to allow it to support multiple Bluetooth core stacks. The selection logic may enable offloading specific applications to an additional stack, such as an embedded stack while supporting the operating system (OS) stack in parallel. Embodiments may also comprise a Bluetooth radio controller with one or more additional host interface drivers to support multiple Bluetooth core stacks.

22 Claims, 5 Drawing Sheets

METHODS AND ARRANGEMENTS FOR A MULTISTACK BLUETOOTH CONTROLLER

BACKGROUND

The present disclosure relates generally to the field of Bluetooth® communication technologies. More particularly, the present disclosure relates to a multistack Bluetooth controller.

DETAILED DESCRIPTION OF EMBODIMENTS

Figure 1:
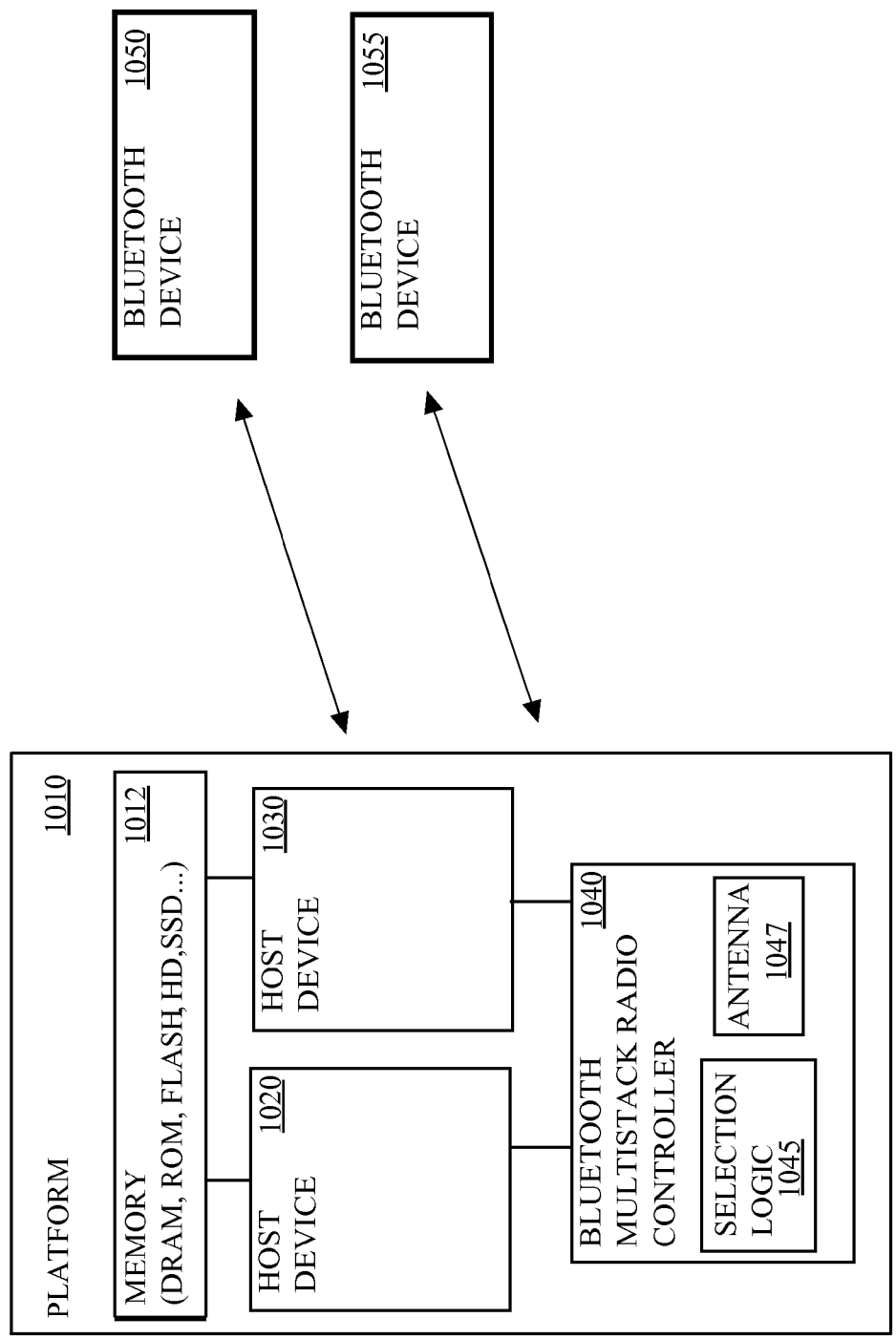
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments describe a multistack Bluetooth controller herein. Embodiments may comprise logic such as hardware and/or code to assign or offload Bluetooth applications from the main processor while maintaining the legacy interface to the OS protocol stack and compatibility to legacy Bluetooth applications. In several embodiments, the Bluetooth® specification (e.g. BLUETOOTH SPECIFICATION Version 4.0, Bluetooth SIG, Inc., Publication date: 30 Jun. 2010) allows multiple instantiations of applications and profiles running on top of a single Bluetooth core stack. The Bluetooth core stack is responsible to multiplex the different applications' requirements and requests to the Bluetooth core radio. Embodiments may comprise selection logic such as a multiplexer in the Bluetooth radio controller to allow it to support multiple host Bluetooth core stacks. In many embodiments, the selection logic may enable offloading of specific applications to an additional stack while supporting the operating system (OS) stack in parallel. In some embodiments, at least one additional stack may comprise an embedded stack, which is a stack executing on an embedded system in an embedded environment.

Embodiments may also comprise a Bluetooth radio controller with one or more additional host interface drivers to support multiple Bluetooth core stacks. Many embodiments comprise an additional Bluetooth host interface driver for each additional host Bluetooth core stack. In some of these embodiments, more than one bus may interconnect the host devices with the Bluetooth radio controller. And further embodiments may comprise a Bluetooth controller that can couple with more than one host devices via each of one or more Bluetooth host interface drivers, wherein each host device comprises a host Bluetooth core stack.

Various embodiments may be designed to address different technical problems associated with all Bluetooth applications running on the main processor and the OS protocol stack. For instance, some embodiments may be designed to address one or more technical problems related to platform power optimization. The technical problem of platform power optimization may involve problems associated with an inability to offload applications from the main processor. In further embodiments, the technical problem may be that security is difficult to maintain, particularly between the multiple applications utilizing the Bluetooth radio controller since all communications pass through the OS protocol stack. In further embodiments, the technical problem may be that consistency across platforms is difficult to maintain due to the use of different operating systems as well as variations in platform capabilities related to the main processor and the OS protocol stack.

Technical problems such as one or more of the technical problems discussed above have not been known in the art until discovery and teaching represented by this disclosure. A lack of understanding of technical problems led to the failure of current art to conceive of, discuss, and describe the solutions such as the solutions described by this disclosure. In other words, the solutions presented herein were not obvious in the art due at least in part to a lack of knowledge of the technical problems by other persons of skill in the art.

Different technical problems such as those discussed above may be addressed by one or more different embodiments. For instance, some embodiments that are designed to address platform power optimization may do so by one or more different technical means such as offloading some Bluetooth applications that are constantly working in the background such as proximity sensing to a second host Bluetooth core stack. Some embodiments that are designed to address platform security may do so by one or more different technical means such as offloading of Bluetooth applications to allow the secure elements in the platform to use the Bluetooth Radio in a secure embedded environment. For example, security can benefit for Hardening usages (sharing secure credentials between devices), Proximity sensing for manageability, etc.

Many embodiments may comprise Bluetooth® compliant hardware and code. Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2007.pdf) and other related wireless standards.

Several embodiments comprise servers, workstations, netbooks, mobile devices (Laptop, Smart Phone, Tablet, cellular phones, and the like), or any other device that may benefit from inclusion of Bluetooth radio reception such as appliances. For example, a laptop, cellular phone, or small battery-powered wireless devices (e.g., sensors) may use Bluetooth to connect to other Bluetooth devices with very low power consumption, greater consistency, and/or higher security.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like WiGig, Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ dual antennas or other multiple antennas. For instance, multiple-input and multiple-output (MIMO) is the use of radio channels carrying signals via multiple antennas at both the transmitter and receiver to improve communication performance. Further embodiments may implement directional antennas or antenna arrays.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a platform 1010 that may comprise a general purpose computer, a specific purpose computer, a Smartphone, or other device that may implement Bluetooth® technology for communications, and two Bluetooth (BT) devices 1050 and 1055. The number of devices is for illustration purposes and may vary depending upon the number and types of BT profiles and applications executing at any particular time.

The platform 1010 may comprise memory 1012, a host 1020, a host 1030, and a BT multistack radio controller 1040. The memory 1012 can be any one or more of a number of different types of volatile and non-volatile data storage devices such as random access memory such as Dynamic Random Access Memory (DRAM) buffers, registers, and cache; read only memory; flash memory; solid state drive; hard disk drive; optical drive; and/or the like. The memory 1012 may accommodate BT applications, BT profiles, preferences, applications and other code, phonebooks, and the like. For instance, the memory 1012 may comprise a preference related to advertising the existence of the BT capabilities of the platform 1010, scanning to discover BT devices such as BT devices 1050 and 1055, initiating connections with other BT devices, establishing connections with BT devices, and/or time periods to remain in standby mode. For example, the platform 1010 may be a smart phone and may operate on battery power for a particular number of hours in standby mode and a particular number of hours when operating.

The host devices 1020 and 1030 may comprise two separate BT host interface (I/F) drivers for communications with the BT multistack radio controller 1040. In some embodiments, one or more of the BT host I/F drivers may comprise a host controller interface (HCI). In other embodiments, the BT host I/F drivers may not comprise a host controller interface (HCI) but may comprise one or more other types of interfaces such as direct interfaces or some manufacturer specific interfaces.

A host device may be an entity defined as all of the layers below the non-core profiles and above the interface such as an HCI with the BT radio controller. A radio controller may be an entity defined as all of the layers below the interface. An implementation of the host device and radio controller may contain the respective parts of the interface. The host devices 1020 and 1030 may comprise logic including hardware and code to implement the host device functionality and the BT multistack radio controller 1040 may comprise logic including hardware and code to implement the radio controller and to transmit and receive BT communications.

The host devices 1020 and 1030 may interpret certain BT profiles stored in memory 1012. The profiles define the possible applications that work with the device. BT profiles are general behaviors through which BT enabled devices communicate with other BT devices. Bluetooth technology defines a wide range of profiles that describe many different types of use cases. The host devices 1020 may perform an application's task by using, for each profile, particular options and parameters at each layer of the stack that are associated with the profile.

The configuration information regarding a profile is in the upper layers of a Bluetooth stack, typically an application layer. The proper profile for a device must be used to establish communication with the device. For example, a device with a profile for a headset may not work with a printer and vice versa. Often times, the devices are also manufacturer and product specific. The various available profiles may change over time and new profiles may be developed.

Many embodiments implement some typical profiles for general operation. Generic access profile ("GAP") is used to manage connections between different BT devices. GAP may expose a high level API that can be used by the application program to configure the stack and manage connections to different Bluetooth products. Services discovery application profile ("SDAP") is used to query other BT products for supported services and functionality. SDAP exposes a high level API that can be used by the application program to query other BT products for supported functionality. Serial port profile ("SPP") provides emulated virtual serial ports over a BT radio link. SPP exposes a high level API that can be used by the application program to transmit and receive data in a way that is very similar to a standard serial port.

In many embodiments, the host devices 1020 may interpret further device class profiles. The present application should in no way to be limited to the profiles described herein.

In some embodiments, the host device 1020 may comprise a part of the main OS for the platform 1010, may execute on one or more main processors for the platform 1010, and may implement a main OS protocol stack for the BT communications. In several embodiments, the host device 1030 may comprise a part of an embedded OS for the platform 1010, may execute on one or more embedded processors for the platform 1010, and may implement an embedded OS protocol stack for the BT communications. For instance, the embedded OS may execute a secure OS that is not visible to the main OS or may be visible to the main OS in the form of an output or a limited, communications portal for the purposes of maintaining security over information or data maintained by the embedded OS.

In other embodiments, the host device 1030 may comprise a low power OS for operating the platform 1010 at a minimal power consumption level or a reduced power consumption level with respect to the main OS operating the host device 1020. In such embodiments, BT profiles and applications in the host device 1030 may execute minimal necessary functionality in lieu of executing such functionality on the main OS host device 1020, allowing the main processor(s) and associated hardware to enter a sleep mode, or low power consumption mode. In some of these embodiments, the functionality passed to the host device 1030 while the main processor(s) are in the sleep mode may pass back to the host device 1020 when the host device 1020 exits the sleep mode.

The BT multistack radio controller 1040 may comprise logic including hardware and code to transmit and receive BT communications for the host devices 1020 and 1030. The BT multistack radio controller 1040 may be implemented in different configurations for various embodiments. For instance, in some embodiments, the BT multistack radio controller 1040 may comprise a basic rate/enhanced data rate (BR/EDR) controller, often referred to as BT Classic.

In some embodiments, the BT multistack radio controller 1040 may comprise a low energy (LE) Controller. And in some embodiments, the BT multistack radio controller 1040 may comprise a combined BR/EDR controller portion and LE controller portion as a single controller, both sharing a single BT device address. In still other embodiments, the BT multistack radio controller 1040 may comprise one or more other types of BT controllers that may or may not be compatible with the BR/EDR controller and the LE controller. In further embodiments, the BT multistack radio controller 1040 may comprise one or more secondary controllers.

Similarly, host devices 1020 and 1030 may comprise BT core host stacks that are design for a particular type of controller. For instance, the host device 1020 may be designed for a BR/EDR controller, an LE controller, a dual mode controller, or one or more other types of BT controller and host device 1030 may be designed for a BR/EDR controller, an LE controller, a dual mode controller, or one or more other types of BT controller. Note that the choice of design of host device 1030 for a particular controller may be independent of the choice of design by the host device 1020 although the BT multistack radio controller 1040 may be designed to operate with both host devices 1020 and 1030.

To illustrate, for embodiments in which the BT multistack radio controller 1040 comprises a BR/EDR controller, the BR/EDR radio (physical layer or PHY) may operate in the unlicensed ISM band at 2.4 GHz. For embodiments in which both host devices are designed for only for a BR/EDR controller, the BT multistack radio controller 1040 may only be designed for the BR/EDR controller. The BT multistack radio controller 1040 may employ a frequency hop transceiver to combat interference and fading and provides many Frequency-hopping spread spectrum (FHSS) carriers. During typical operation a physical radio channel is shared by a group of devices (referred to as a piconet) that are synchronized to a common clock and frequency-hopping pattern. One device provides the synchronization reference and is known as the master device. All other devices synchronized to a master device's clock and frequency-hopping pattern are known as slave devices.

The BT multistack radio controller 1040 may comprise selection logic 1045. The selection logic 1045 may comprise hardware and/or code to facilitate identification and selection of the host device 1020 or 1030 from which communications are received and to which communications are addressed. For example, the host device 1020 may establish a connection with the BT device 1050 and the host device 1030 may establish a connection with the BT device 1055. The host device 1020 may transmit a packet addressed to the BT device 1050 to the BT multistack radio controller 1040. The BT multistack radio controller 1040 may encode the packet in a wireless communication and transmit the wireless communication to the BT device 1050.

In some embodiments, the source address of a host device such as 1020 or 1030 may be assigned at the time of manufacture, included in firmware, assigned when the host device first communicates in a network of BT devices, and/or may be assigned on a communication-by-communication basis. For instance, a host device that is designed for operation with multiple different BT controller types (e.g., BR/EDR, LE, Dual Mode, or other controller type) may utilize more than one process of determining a source address and may have more than one source address assigned to the host device concurrently.

The BT device 1055 may transmit a wireless communication to the BT multistack radio controller 1040 addressed for the host controller 1030. The BT multistack radio controller 1040 may decode the wireless communication to determine a packet addressed for the host device 1030. The selection logic 1045 may identify the destination of the wireless communication as the host device 1030 and transmit the packet to the host device 1030.

For embodiments in which the host device 1030 operates only for offloading operations, the selection logic 1045 may redirect communications to the host device 1030 while the host device 1020 is in a sleep mode or is otherwise unavailable.

In many embodiments, the BT devices 1050 and 1055 may comprise servers, workstations, netbooks, mobile devices such as Laptop, Smart Phone, Tablet, cellular phones, and, other devices that implement BT communications.

In several embodiments, since the BT multistack radio controller 1040 operates for two or more host devices 1020 and 1030, the BT devices 1050 and 1055 may perceive the platform 1010 as two or more distinct BT devices due to distinct actions, addresses, communications, or the like from the two or more host devices 1020 and 1030. In other embodiments, one or both of the host devices 1020 and 1030 may only be visible to particular BT devices so, for instance, the host device 1030 may decide not to be responsive to inquiries from BT 1050 and may, in some embodiments, operate in accordance with a different controller type than BT device 1050.

Some embodiments comprise an antenna 1047 that may be an antenna array comprising antenna elements. In further embodiments, the antenna 1047 may comprise single, dual, or other number of antennas. An antenna array may be an array of individual, separately excitable antenna elements. The signals applied to the elements of the antenna 1047 cause the antenna to radiate spatial channels. Each spatial channel so formed may carry information.

Figure 2:
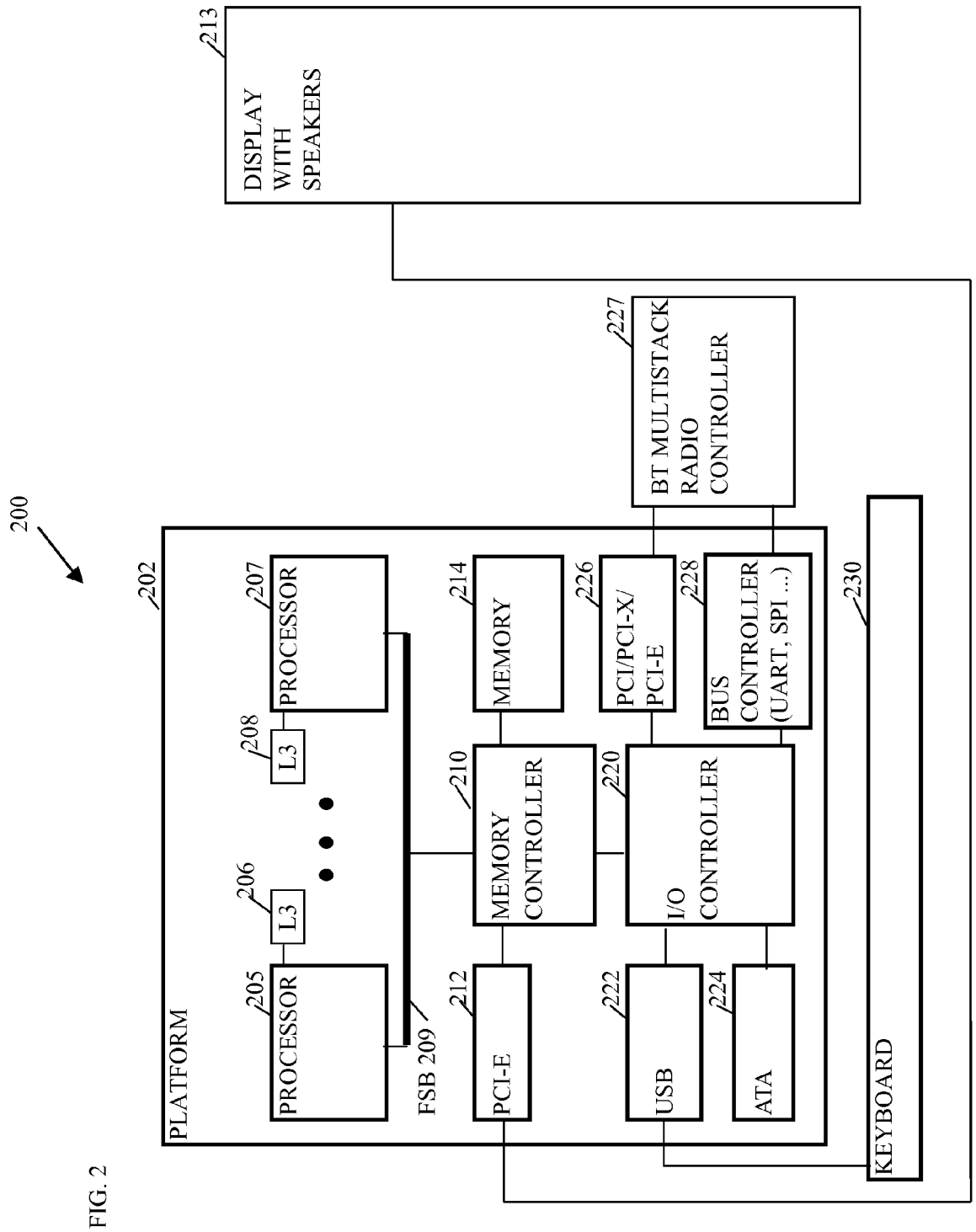
FIG. 2 depicts an embodiment of a host platform for a multistack Bluetooth controller.

FIG. 2 depicts an embodiment of a system 200 including a platform 202 such as a desktop, laptop, smartphone, or other type of device with BT capabilities. Platform 202 is adapted to accommodate an optional device connected to at least one bus controller such as a Peripheral Component Interconnect/Peripheral Component Interconnect-Extended/Peripheral Component Interconnect-Express (PCI/PCI-X/PCI-E) bus 226 such as a BT multistack radio controller 227. In the present embodiment, the platform 220 couples with the BT multistack radio controller 227 via a second bus also via a bus controller 228, which may be, e.g., a UART, SPI, or other type of bus. In some embodiments, the BT multistack radio controller 227 to may be a printed circuit board that plugs into the bus connection such as an expansion port or a cable connector.

The BT multistack radio controller 227 may comprise an antenna to transmit and receive BT communications, two or more host interface (I/F) drivers to interconnect with two or more host devices of platform 202, and selection logic to direct communications from other BT devices to the corresponding host devices of platform 202. For example, the host devices may execute on processors 205 through 207. In some embodiments, the host devices may execute on one or more of the processors depending upon the loading of the processors. In some embodiments, the host devices may be assigned to logical processors such as in a logical partitioning scheme. The host devices may be assigned to partitions that are assigned a percentage of cycles or particular numbers of cycles of processing times. The particular percentage of cycles or numbers of cycles may be distributed to one or more of the processors 205 through 207. And, in still other embodiments, the host devices may be assigned to physical processors. For example, a first host device may be assigned to the processor 205 and a second host device may be assigned to processor 207.

Logical partitioning of resources such as process, memory, peripherals, and the like can facilitate a virtual or logical separation of the hardware to provide a level of security between the communications of the host devices with other BT devices. In logical partitioned systems, a virtual machine manager executing on the main OS of the platform 202 may provide security measures to prevent software such as malicious software in one partition from accessing data or communications of another partition. However, the use of virtual machine manager software operating on a main OS creates some security risks.

Further embodiments may implement embedded environments in addition to or in lieu of logical partitioning of the resources. The platform 202 may partition hardware resources between one or more embedded environments and the main OS environment or just between a number of embedded environments. In embedded environments, the assignment of physical or logical resources can occur at the hardware level, e.g., during or before the basic input output system (BIOS) such that other embedded environments and even a main OS environment may not be aware of the existence of the hardware resources assigned to an embedded environment.

In such embodiments, a host device may execute in the main OS and a host device may execute in an embedded system of an embedded environment. The host device and other applications executing on the main OS may not be aware of the logical or physical resources assigned to the embedded system and may not be aware of the embedded system, providing significant improvements in security of communications between the host device in the embedded system and the BT multistack radio controller 227. For instance, the embedded system may be a secure OS, executing within a secure embedded environment, which encrypts packets transmitted to the BT multistack radio controller 227 for wireless communication to another BT device in the secure embedded environment and decrypts encrypted packets from another BT device within the secure embedded environment.

Furthermore, by implementing a consistent, cross platform embedded system in a consistent embedded environment for a host device on platforms like platform 202, the offloading of some Bluetooth applications into an embedded environment may provide a consistent experience across platforms that is agnostic to the main OS.

The BT multistack radio controller 227 may transmit communications destined for the host devices through a bus controller such as PCI/PCI-X/PCI-E 226 and the PCI/PCI-X/PCI-E 226 may transmit the information to the host devices executing on a designated processor such as processor 205 or 207 on the front-side bus (FSB) 209. The PCI/PCI-X/PCI-E 226 may comprise one or more controllers, each capable of controlling one or more PCI or PCI-X or PCI-E agents. PCI agents may be, e.g., hot swappable PCI cards connected to devices such as other computers, hard drives, Ethernet networks, fiber-optic networks, wireless networks, and the like.

Once the information is received, the PCI/PCI-X/PCI-E 226 transfers the information to Input-Output (I/O) controller 220 in the form of one or more packets. The I/O controller 220 is adapted to receive inbound transactions from a variety of I/O devices, route the inbound transactions upbound to processors 205 and 207 via memory controller 210, and route outbound transactions received via the memory controller 210 to the corresponding I/O devices. In other embodiments, the platforms may have different configurations such as the memory controller 210 and the I/O controller 220 in the same physical chip or package.

The I/O controller 220 may couple with other I/O interfaces such as universal serial bus (USB) 222, AT attachment (ATA) 224, and/or the bus controller 228. USB 222 may comprise, e.g., high-speed USB 3.0 ports, which are backwards compatible to process USB 1.1 communications. USB 222 may handle data transfer from USB devices such as a keyboard 230 or other devices like a mouse, a hard drive, an optical drive, a tape drive, and the like.

In the present embodiment, the memory controller 210 may also be referred to as a graphics and memory controller due to enhanced capabilities related to handling high-bandwidth graphics communications such as communications from a graphics accelerator card.

The memory controller 210 may couple with memory 214 and a bus controller such as PCI Express (PCI-E) bus 212 or anther bus type.

In the present embodiment, the PCI-E 212 may transmit information to a display with speakers to communicate the information to a user of the platform 202. In some embodiments, a bus arbiter for FSB 209 may coordinate transmission across FSB 209 according to availability of the processors.

The FSB 209 may be a front-side bus for processors 205 and 207 of platform 202. The FSB 209 may comprise the bus arbiter to coordinate transmission of transactions on the FSB 209. In other embodiments, the platform 202 may comprise high-speed, serial buses rather than an FSB.

Processors 205 and 207 represent two or more processors. In some embodiments, each of the processors may comprise multiple processor cores. In other embodiments, the processors 205 and 207 may represent multiple cores of a single processor. Further embodiments may comprise a single processor with a single core.

Figure 3:
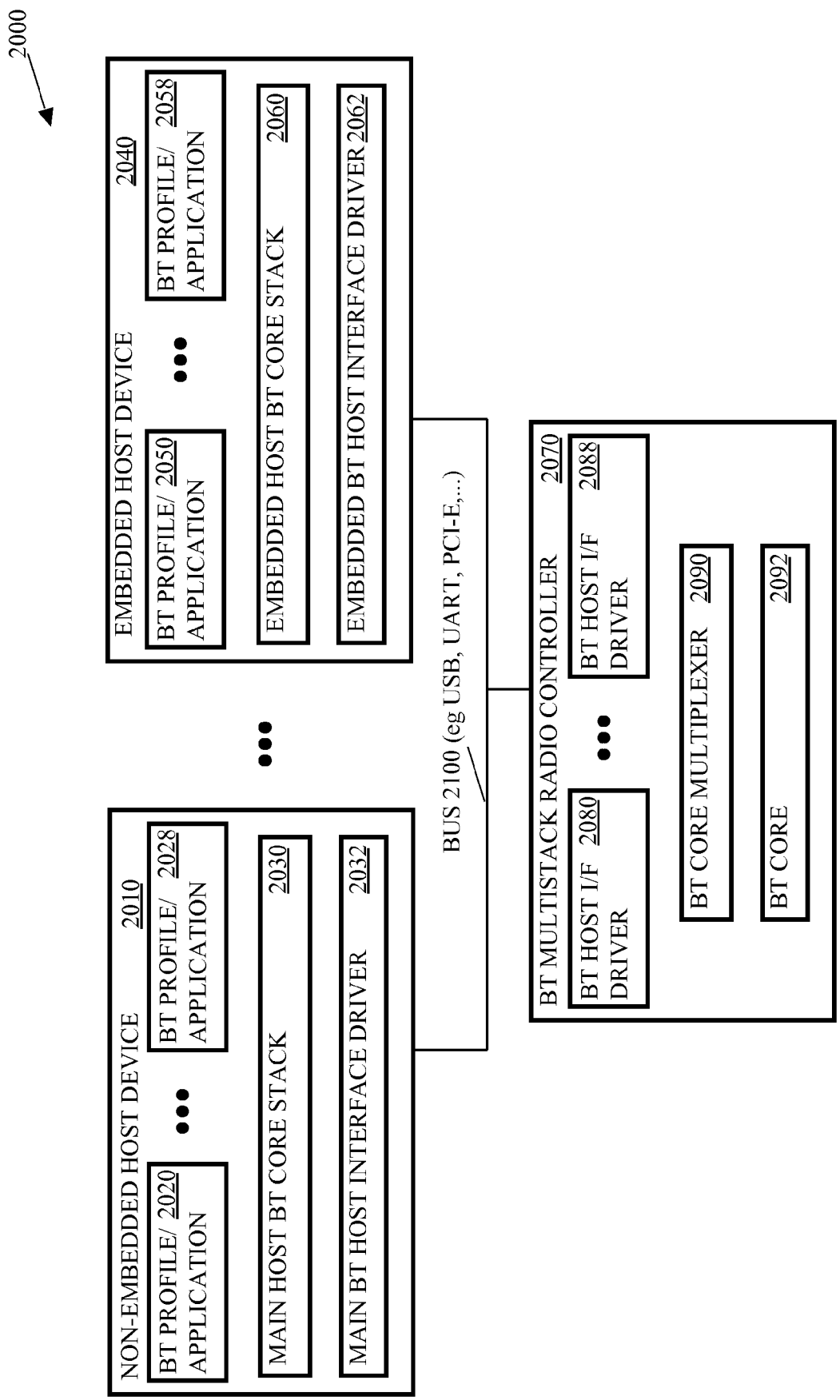
FIG. 3 depicts an embodiment of an apparatus with two or more host devices and a Bluetooth multistack radio controller.

FIG. 3 depicts an embodiment of an apparatus 2000 partitioned between two or more host devices 2010-2040 and the Bluetooth radio controller 2070. The apparatus 2000 may comprise a non-embedded host device 2010 operating on a main OS or within a non-embedded environment such as a virtual or logical environment and at least one other host device, the embedded host device 2040, which operates in a secure embedded environment on an embedded system. The embedded system may, for example, comprise a BT profile/application 2050 for background proximity sensing and may allow execution of Bluetooth applications such as BT profile/applications 2050 through 2058 in a secure environment that protects these applications from malicious attacks that might affect the main OS. In other embodiments, the more than one host devices may all be embedded or non-embedded host devices or another combination thereof.

In some embodiments, the BT profile/applications 2020 through 2028 of non-embedded host device 2010 and 2050 through 2058 of embedded host device 2040 may comprise corresponding functionality to facilitate offloading of applications when the main OS places the environment of the non-embedded host device 2010 in a power savings mode. In several embodiments, the embedded host device 2040 may comprise some general or core applications executing on an embedded system that is consistent across multiple platforms to provide consistency in the implementations of the embedded host device across the multiple platforms despite the different main OS's executing on the different platforms. In some embodiments, the embedded system and the embedded environment are consistent across multiple platforms irrespective of the OS and of differences in hardware resources.

The host devices 2010-2040 may comprise a Host BT Core Stack such as main host BT core stack 2030 and embedded host BT core stack 2060. Applications that interact with the host device 2010-2040 use the Host BT Core Stack 2030-2060 functionality by calling different API functions. The Host BT Core Stack 2030-2060 takes care of the complex communication rules that are defined in the Bluetooth specification, and manages communication with the BT profile/applications 2020-2028 and 2050-2058, which primarily relate to profile configuration and interaction with external software applications.

The Host BT Core Stack 2030-2060 may provide services such as a Telephony control specification ("TCS") layer that provides call control and signaling of voice channels; a Wireless application protocol ("WAP") layer that handles control and signaling for WAP transmission; an Object exchange ("OBEX") layer that handles responses coming from the lower layers and distinguishes between the multiple responses; a Radio frequency communications ("RF-COMM") layer that implements functionality for a virtual serial link, including modem control signals. And a Service Discovery Protocol ("SDP") layer that provides functionality to publish supported Bluetooth functionality (SDP server) as well as to query other Bluetooth products for Bluetooth functionality (SDP client). In some embodiments, several application profiles use RFCOMM to send and receive data.

The Host BT Core Stack 2030-2060 may also comprise a Logical Link Control and Adaptation Protocol ("L2CAP") layer that allows multiple communication channels to share a single Bluetooth link (multiplexing). The L2CAP layer may also handles segmentation and assembly of long messages.

The host devices 2010-2040 may each access a BT multistack radio controller 2070 via a BT host I/F driver such as a main BT host I/F driver 2032 and an embedded BT host I/F driver 2062. In some embodiments, one or more of the host devices 2010-2040 may implement Host controller interface ("HCI") drivers to provide standardized communications protocols between the host BT core stacks 2030-2060 and the BT multistack radio controller 2070. In some embodiments, none of the host devices 2010-2040 may implement Host controller interface ("HCI") drivers. In further embodiments, all of the host devices 2010-2040 may implement Host controller interface ("HCI") drivers. Communications packets such as HCI communications packets or other packets may be transmitted over a bus 2100 comprising a Universal Asynchronous Receiver/Transmitter (UART) bus, a USB, PCI-E bus, or other interfaces.

The BT multistack radio controller 2070 may comprise BT Host I/F drivers 2080-2088 to communicate via the bus 2100 with the BT Host I/F drivers 2032-2062. In the present embodiment, the BT multistack radio controller 2070 may comprise a BT host I/F driver for each host device such as a BT host I/F driver 2080 for the non-embedded host device 2010 and a BT host I/F driver 2088 for the embedded host I/F driver 2062.

The BT multistack radio controller 2070 may comprise a BT core multiplexer 2090 to provide selection logic to identify packets destined to each of the host devices and to select the appropriate BT host I/F driver through which to transmit the packets. For example, the embedded host device 2040 may transmit a packet through the embedded BT host I/F driver 2062 through the bus 2100 and to the BT multistack radio controller 2070 at the BT host I/F driver 2088 to instruct the BT core 2092 to scan for nearby BT devices. The BT core 2092 may scan for BT communications and, upon determining that there is a BT device nearby or determining that there is no detectable BT device nearby, the BT core may generate a response packet for the embedded host device 2040. The BT core multiplexer 2090 may determine that the packet is addressed to the embedded host device 2040 and transmit the packet through the BT host I/F driver 2088 to the embedded BT host I/F driver 2062. In some embodiments, the BT core multiplexer 2090 may select the main host interface driver for transmission of the packet to the non-embedded host device 2010 based upon an identification of the main host in the content of the communication having the destination identified as the non-embedded host device 2010.

The BT multistack radio controller 2070 may comprise a BT core 2092 to execute physical layer BT functionality such as encapsulating packets for transmission to other BT devices and transmitting the communications to the other BT devices, as well as receiving BT communications destined for a host device and transmitting a corresponding packet to the particular host device.

In some embodiments, the BT core 2092 comprises logic to associate a communication from the main host device with the main host device and to associate a communication from the embedded host device with the embedded host device. In further embodiments, the BT core 2092 comprises logic to transmit a communication from the main host device to another Bluetooth device. In several embodiments, the BT core 2092 comprises logic to decode the content of the communication and encapsulate the content in the packet in accordance with a bus protocol for the bus 2100 to interconnect the main BT host interface driver 2080 and the non-embedded host device 2010.

Figure 4:
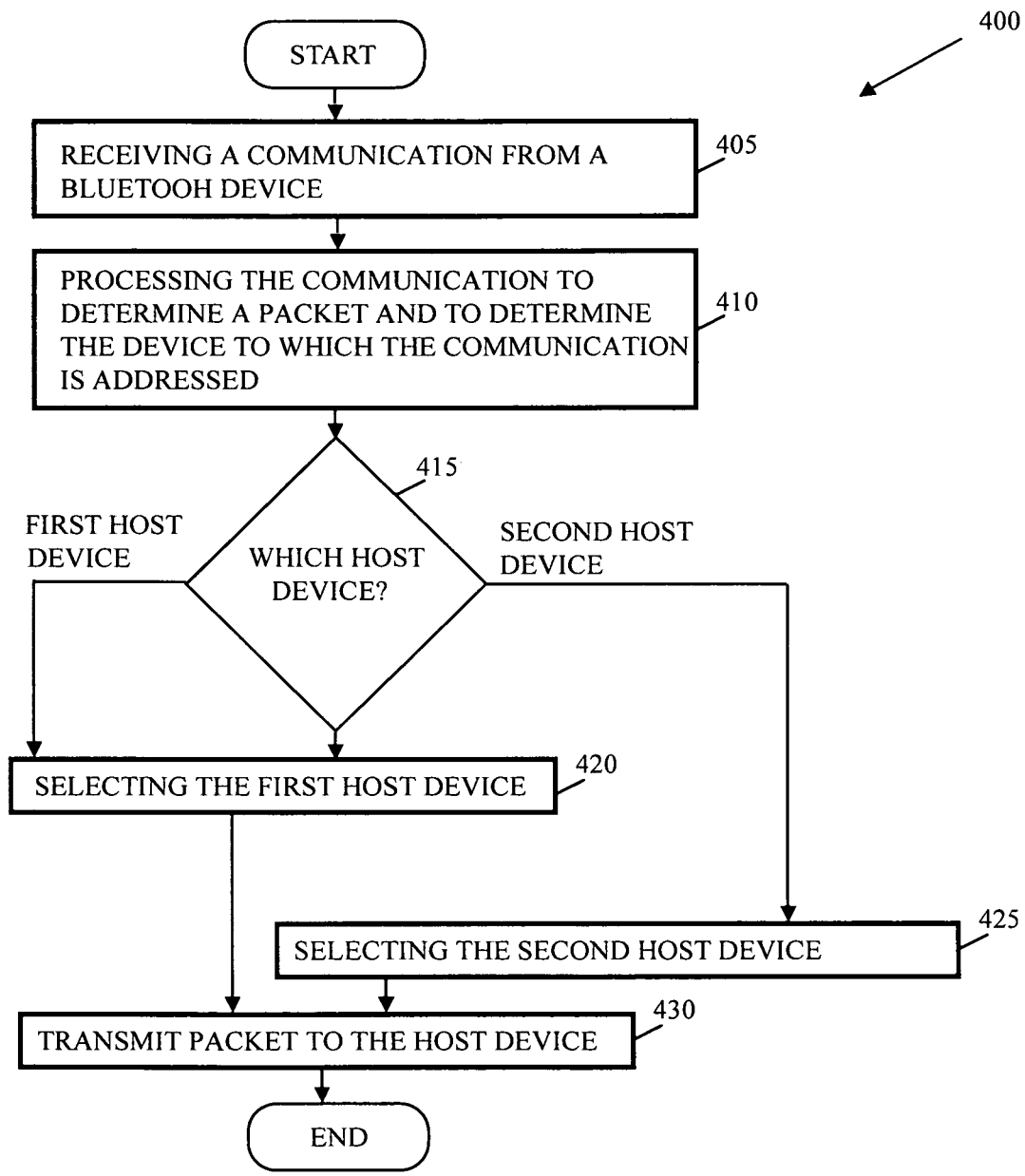
FIG. 4 depicts an embodiment of a flowchart to send a Bluetooth communication from a host controller.

FIG. 4 depicts an embodiment of a flowchart 400 for receiving a BT communication destined for one of two or more host devices such as the host devices described in conjunction with FIGS. 1-3. The flow chart 400 begins with receiving a communication from a BT device (element 405) at a BT multistack radio controller. For example, the communication may be an advertisement from a nearby BT device, may be a response to a communication initiated by one of the host devices to the BT device, or the like.

The BT multistack radio controller may comprise logic such as logic in the BT core to process the communication to determine a packet and to determine the host device to which the communication is addressed (element 410). For example, in some embodiments, an advertisement from another BT device may be transmitted to a main host device. In some embodiments, an advertisement may be transmitted to both or all the host devices and, in further embodiments, an advertisement may be transmitted to an embedded host device. In several embodiments, the destination of an advertisement may be set as a preference.

In another situation, the communication may be responsive to a communication from a host device and may be addressed to the host device. In such situations, the BT core logic may identify the destination as a particular host device based upon the communication from the BT device (element 415) and selection logic coupled with the BT core to receive a signal from the BT core to select a host interface driver associated with the particular host device through which to transmit content of the communication in the form of a packet (element 420 or 425).

After selecting the host device at element 420 or 425, the BT multistack radio controller may transmit the packet to the identified host device (element 430). For instance, the BT multistack radio controller may encapsulate the content of the communication in a packet in accordance with the protocol of communication through a bus that interconnects the particular host device with the BT multistack radio controller. In many embodiments, a common bus may interconnect all the host devices with the BT multistack radio controller. In other embodiments, one or more of the host devices may couple with the BT multistack radio controller through different buses that may or may not have the same bus protocol. For example, a secure environment may interconnect with the BT multistack radio controller through a distinct bus from the bus that interconnects a main host device with the BT multistack radio controller.

In further embodiments, a host interface driver may be associated with more than one host. In such embodiments, arbitration logic of the BT multistack radio controller or one of the host devices or the platform may coordinate communications between the host devices and the BT multistack radio controller. In other embodiments, communications may be implemented via a bus contention scheme. The host device may include a source address and the BT multistack radio controller may include the source address in communications directed specifically at the particular host device.

In some embodiments, the source address of a host device may be assigned at the time of manufacture, included in firmware, assigned when the host device first communicates in a network of BT devices, and/or may be assigned on a communication-by-communication basis. For instance, a host device that is designed for operation with multiple different BT controller types may utilize more than one process of determining a source address and may have more than one source address assigned to the host device concurrently.

Figure 5:
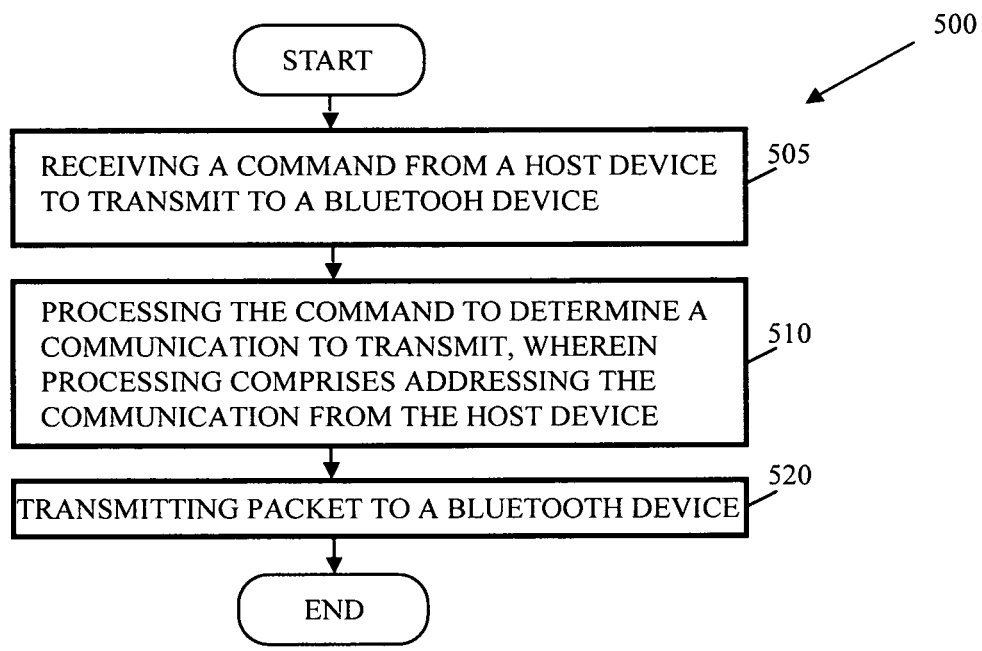
FIG. 5 depicts an embodiment of a flowchart to receive a Bluetooth communication for a host device.

FIG. 5 depicts an embodiment of a flowchart 500 for transmitting a BT communication from a host device to a BT device such as the host devices and BT devices described in conjunction with FIGS. 1-3. The flow chart 500 begins with receiving a command from a host device to transmit to a BT device (element 505) at a BT multistack radio controller. In many embodiments, the BT core processes the command to determine a communication to transmit, wherein the processing comprises identifying the host device in the communication from the host device (element 510) such that the BT multistack radio controller can identify the host device in a response from the BT device. The BT multistack radio controller may then transmit the communication to the BT device.

The following examples pertain to further embodiments. One example comprises a method. The method may involve receiving, by a multistack radio controller, a communication from a Bluetooth device; processing the communication to determine a packet to transmit to a first host device and to identify the first host device to which to transmit the packet, wherein the multistack radio controller is coupled with at least two host devices; selecting the first host device by selecting a first host interface driver through which to transmit the packet; and transmitting, by the multistack radio controller, the packet to the first host device.

Some embodiments further comprise receiving a command from the first host device to transmit a second communication to a Bluetooth device. Some embodiments further comprise processing the command to determine the second communication to transmit, wherein processing comprises identifying, in the second communication from first the host device, the first host device. Some embodiments further comprise transmitting the second communication to the Bluetooth device. In some embodiments, processing the communication to determine the packet to transmit to the first host device comprises decoding the content of the communication and encapsulating the content in the packet in accordance with a bus protocol for a bus that interconnects the multistack radio controller and the first host device. In some embodiments, selecting the first host device by selecting the first host interface driver through which to transmit the packet comprises selecting, with a multiplexer, the first host interface driver for transmission of the packet to the first host device.

Some embodiments comprise at least one computer program product for communication of a packet with a short frame, the computer program product comprising a computer useable medium having a computer useable program code embodied therewith, the computer useable program code comprising computer useable program code configured to perform operations, the operations for low power active radio reception according to any one or more of the methods above.

A system for enabling multiple Bluetooth host stacks may comprise hardware and code according to any one or more of the methods above, wherein the system further comprises an antenna.

One example comprises an apparatus for enabling multiple Bluetooth host stacks. The apparatus may comprise at least one Bluetooth host interface driver to couple with a first host device comprising a first host Bluetooth core stack and to couple with a second host device comprising a second host Bluetooth core stack; and selection logic to select the first Bluetooth host interface driver to transmit a content of a communication having a destination identified as the first host device and to select the second Bluetooth host interface driver to transmit a content of a communication having a destination identified as the second host device.

Some embodiments further comprise a Bluetooth core to receive the communication and to decode the communication. In some embodiments, the Bluetooth core comprises logic to associate a communication from the first host device with the first host device and to associate a communication from the second host device with the second host device. In some embodiments, the Bluetooth core comprises logic to transmit a communication from the first host device to another Bluetooth device. In some embodiments, the Bluetooth core comprises logic to decode the content of the communication and encapsulate the content in the packet in accordance with a bus protocol for a bus to interconnect the at least one Bluetooth host interface driver and the first host device. In some embodiments, the selection logic comprises a multiplexer to select the at least one host interface driver for transmission of the packet to the first host device based upon an identification of the first host in the content of the communication having the destination identified as the first host device.

And some embodiments comprise a system comprising the apparatus according to any one or more of or all of the apparatus elements above and comprising an antenna.

One example comprises a system for enabling multiple Bluetooth host stacks. The system may comprise a first host device comprising a first host Bluetooth core stack a second host device comprising a second host Bluetooth core stack; at least one Bluetooth host interface driver coupled with the first host device and coupled with the second host device; and selection logic to select the at least one Bluetooth host interface driver to transmit a content of a communication having a destination identified as the first host device and to select the at least one Bluetooth host interface driver to transmit a content of a communication having a destination identified as the second host device.

Some embodiments further comprise a Bluetooth core to receive the communication and to decode the communication. In some embodiments, the Bluetooth core comprises logic to associate a communication from the first host device with the first host device and to associate a communication from the second host device with the second host device. In some embodiments, the Bluetooth core comprises logic to transmit a communication from the first host device to another Bluetooth device. In some embodiments, the Bluetooth core comprises logic to decode the content of the communication and encapsulate the content in the packet in accordance with a bus protocol for a bus to interconnect the at least one Bluetooth host interface driver and the first host device. In some embodiments, the selection logic comprises a multiplexer to select the at least one host interface driver for transmission of the packet to the first host device based upon an identification of the first host in the content of the communication having the destination identified as the first host device.

One example comprises a computer program product for enabling multiple Bluetooth host stacks. The computer program product may comprise a computer useable medium having a computer useable program code embodied therewith, the computer useable program code comprising computer useable program code configured to perform operations, the operations comprising: receiving, by a multistack radio controller, a communication from a Bluetooth device; processing the communication to determine a packet to transmit to a first host device and to identify the first host device to which to transmit the packet, wherein the multistack radio controller is coupled with at least two host devices; selecting the first host device by selecting a first host interface driver through which to transmit the packet; and transmitting, by the multistack radio controller, the packet to the first host device.

Some embodiments further comprise receiving a command from the first host device to transmit a second communication to a Bluetooth device. Some embodiments further comprise further comprising processing the command to determine the second communication to transmit, wherein processing comprises identifying, in the second communication from first the host device, the first host device. Some embodiments further comprise transmitting the second communication to the Bluetooth device. In some embodiments, processing the communication to determine the packet to transmit to the first host device comprises decoding the content of the communication and encapsulating the content in the packet in accordance with a bus protocol for a bus that interconnects the multistack radio controller and the first host device. In some embodiments, selecting the first host device by selecting the first host interface driver through which to transmit the packet comprises selecting, with a multiplexer, the first host interface driver for transmission of the packet to the first host device.

Another embodiment is implemented as a program product for implementing systems, apparatuses, and methods described with reference to FIGS. 1-5. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, WiGig, Bluetooth®™, Ethernet, Wi-Fi, and WiDi adapter cards are just a few of the currently available types of network adapters.

What is claimed is:

1. An apparatus for enabling multiple host devices, the apparatus comprising:
a Bluetooth radio controller to couple with a bus to communicate with the multiple Bluetooth host devices; wherein the Bluetooth radio controller comprises:
one or more Bluetooth host interface drivers to communicatively couple with a first host device comprising a first host Bluetooth core stack and to communicatively couple with a second host device comprising a second host Bluetooth core stack;
a Bluetooth core to receive and to decode a transmission comprising a communication with a destination of one of multiple Bluetooth host devices; and
selection logic to communicatively couple the Bluetooth core with the one or more Bluetooth host interface drivers to identify the destination of the communication and to transmit the communication to the first host device if the communication has the destination identified as the first host device, and to transmit the communication to the second host device if the communication has the destination identified as the second host device, wherein the selection logic comprises logic to identify the destination as an embedded Bluetooth host device to transmit the packet to the embedded Bluetooth host device, the Bluetooth radio controller to transmit encrypted packets from another Bluetooth device to the embedded Bluetooth host device in a secure embedded environment, the secure embedded environment to comprise a secure operating system to execute on the embedded Bluetooth host device and to decrypt the encrypted packets within the secure embedded environment.

2. The apparatus of claim 1, wherein the Bluetooth core comprises logic to receive and to decode the transmission comprising the communication having the destination identified as the first host device.

3. The apparatus of claim 2, wherein the Bluetooth core comprises logic to associate a communication from the first host device with the first host device and to associate a communication from the second host device with the second host device.

4. The apparatus of claim 3, wherein the Bluetooth core comprises logic to decode the transmission to determine the communication having the destination identified as the first host device and encapsulate the communication in the packet in accordance with a bus protocol for a bus to interconnect the one or more Bluetooth host interface driver and the first host device.

5. The apparatus of claim 4, wherein the selection logic comprises a multiplexer to select a driver from the one or more Bluetooth host interface drivers for transmission of the packet to the first host device based upon an identification of the first host device as the destination of the communication, wherein the one or more Bluetooth host interface drivers comprises more than one Bluetooth host interface drivers.

6. A system for enabling multiple host devices, the system comprising:
a first host device comprising a first host Bluetooth core stack;
a second host device comprising a second host Bluetooth core stack; and
a Bluetooth radio controller comprising:
one or more Bluetooth host interface drivers communicatively coupled with the first host device and communicatively coupled with the second host device;
a Bluetooth core to receive and to decode a transmission comprising a communication with a destination of one of multiple Bluetooth host devices; and
selection logic to communicatively couple the Bluetooth core with the one or more Bluetooth host interface drivers to identify the destination of the communication and to transmit the communication to the first host device if the communication has the destination identified as the first host device, and to transmit the communication to the second host device if the communication has the destination identified as the second host device, wherein the selection logic comprises logic to identify the destination as an embedded Bluetooth host device to transmit the packet to the embedded Bluetooth host device, the Bluetooth radio controller to transmit encrypted packets from another Bluetooth device to the embedded Bluetooth host device in a secure embedded environment, the secure embedded environment to comprise a secure operating system to execute on the embedded Bluetooth host device and to decrypt the encrypted packets within the secure embedded environment; and
one or more antennas coupled with the Bluetooth radio controller.

7. The system of claim 6, wherein the Bluetooth core comprises logic to receive and to decode the transmission comprising the communication having the destination identified as the first host device.

8. The system of claim 7, wherein the Bluetooth core comprises logic to associate a communication from the first host device with the first host device and to associate a communication from the second host device with the second host device.

9. The system of claim 8, wherein the Bluetooth core comprises logic to decode the transmission to determine the communication having the destination identified as the first host device and encapsulate the communication in the packet in accordance with a bus protocol for a bus to interconnect the one or more Bluetooth host interface driver and the first host device.

10. The system of claim 9, wherein the selection logic comprises a multiplexer to select a driver from the one or more Bluetooth host interface drivers for transmission of the packet to the first host device based upon an identification of the first host device as the destination of the communication, wherein the one or more Bluetooth host interface drivers comprises more than one Bluetooth host interface drivers.

11. A method for enabling multiple host devices, the method comprising:
receiving, by a Bluetooth radio controller, a wireless communication from a Bluetooth device, wherein the Bluetooth radio controller is coupled with more than one host devices;
decoding, by the Bluetooth radio controller, the communication to determine a packet based upon the communication, the communication comprising a destination that associates the packet with at least one host device of the more than one host devices;
identifying, by the Bluetooth radio controller, the destination as at least one host device of the more than one host devices to which the packet is addressed;
transmitting, by the Bluetooth radio controller, the packet to a first host device if the first host device is identified as the destination of the packet; and
transmitting, by the Bluetooth radio controller, the packet to a second host device if the second host device is identified as the destination;
wherein identifying the destination comprises identifying the destination as an embedded Bluetooth host device to transmit the packet to the embedded Bluetooth host device, the Bluetooth radio controller to transmit encrypted packets from another Bluetooth device to the embedded Bluetooth host device in a secure embedded environment, the secure embedded environment to comprise a secure operating system to execute on the embedded Bluetooth host device and to decrypt the encrypted packets within the secure embedded environment.

12. The method of claim 11, further comprising receiving a command from a first host device of the more than one host devices to transmit a second communication to the Bluetooth device.

13. The method of claim 12, further comprising processing the command to determine the second communication to transmit, wherein processing comprises identifying, in the second communication, the first host device.

14. The method of claim 11, wherein determining the packet based upon comprises decoding the transmission to determine the communication and encapsulating the communication in the packet in accordance with a bus protocol for a bus that interconnects the Bluetooth radio controller and the at least one host device.

15. The method of claim 11, further comprising selecting, by the Bluetooth radio controller, a Bluetooth host interface driver from more than one Bluetooth host interface drivers in the Bluetooth radio controller, to direct the packet to the least one host device.

16. The method of claim 11, wherein identifying the at least one host device of the more than one host devices to which the packet is addressed comprises determining, by the Bluetooth radio controller, an address associated with the packet and identifying the least one host device based upon the address.

17. A computer program product for enabling multiple host devices, the computer program product comprising:
a non-transitory, computer useable medium having a computer useable program code embodied therewith, the computer useable program code comprising computer useable program code configured to perform operations, the operations comprising:
receiving, by a Bluetooth radio controller, a wireless communication from a Bluetooth device, wherein the Bluetooth radio controller is coupled with more than one host devices;
decoding, by the Bluetooth radio controller, the communication to determine a packet based upon the communication, the communication comprising a destination that associates the packet with at least one host device of the more than one host devices;
identifying, by the Bluetooth radio controller, the destination as at least one host device of the more than one host devices to which the packet is addressed;
transmitting, by the Bluetooth radio controller, the packet to a first host device if the first host device is identified as the destination of the packet; and
transmitting, by the Bluetooth radio controller, the packet to a second host device if the second host device is identified as the destination;
wherein identifying the destination comprises identifying the destination as an embedded Bluetooth host device to transmit the packet to the embedded Bluetooth host device, the Bluetooth radio controller to transmit encrypted packets from another Bluetooth device to the embedded Bluetooth host device in a secure embedded environment, the secure embedded environment to comprise a secure operating system to execute on the embedded Bluetooth host device and to decrypt the encrypted packets within the secure embedded environment.

18. The computer program product of claim 17, further comprising receiving a command from a first host device of the more than one host devices to transmit a second communication to the Bluetooth device.

19. The computer program product of claim 18, further comprising processing the command to determine the second communication to transmit, wherein processing comprises identifying, in the second communication, the first host device.

20. The computer program product of claim 17, wherein determining the packet based upon the communication comprises decoding the transmission to determine the communication and encapsulating the communication in the packet in accordance with a bus protocol for a bus that interconnects the Bluetooth host-controller and the at least one host device.

21. The computer program product of claim 17, further comprising selecting, by the Bluetooth radio controller, a Bluetooth host interface driver from more than one Bluetooth host interface drivers in the Bluetooth radio controller, to direct the packet to the least one host device.

22. The computer program product of claim 17, wherein identifying the at least one host device of the more than one host devices to which the packet is addressed comprises determining, by the Bluetooth radio controller, an address associated with the packet and identifying the least one host device based upon the address.

\* \* \* \* \*